United States Patent [19]

Lambrinos et al.

[11] Patent Number: 5,507,668

[45] Date of Patent: Apr. 16, 1996

[54] CABLE ASSEMBLY FOR MULTIPLE ELECTRONIC COMPONENTS

[75] Inventors: William T. Lambrinos, Endicott; Richard F. Progovitz, Johnson City, both of N.Y.

[73] Assignee: International Business Machines Corporation, Armonk, N.Y.

[21] Appl. No.: 315,211

[22] Filed: Sep. 27, 1994

Related U.S. Application Data

[63] Continuation of Ser. No. 57,363, May 5, 1993, abandoned.

[51] Int. Cl.⁶ .................................................. H01R 31/02
[52] U.S. Cl. ..................................... 439/502; 439/638
[58] Field of Search ...................... 439/638, 639, 439/640, 650–655, 502, 505, 76

[56] References Cited

U.S. PATENT DOCUMENTS

| | | | |
|---|---|---|---|
| 2,495,280 | 1/1950 | O'Brien et al. | 174/117 |
| 2,752,582 | 6/1956 | Cargill | 439/652 |
| 3,660,728 | 5/1972 | Carter | 439/76 |
| 3,715,627 | 2/1973 | D'Ausilio | 317/99 |
| 3,740,698 | 6/1973 | Jerominek | 439/61 |
| 4,337,480 | 6/1982 | Bourassin et al. | 358/93 |
| 4,450,487 | 5/1984 | Koide | 358/335 |
| 4,602,164 | 7/1986 | Gore, III et al. | 307/91 |
| 4,639,054 | 1/1987 | Kersberger | 439/68 |
| 4,760,375 | 6/1988 | Stecker | 439/59 |
| 4,851,708 | 7/1989 | Palmer | 307/141 |
| 4,974,121 | 11/1990 | Masuko et al. | 361/428 |
| 5,130,893 | 7/1992 | Straate et al. | 361/392 |
| 5,276,443 | 1/1994 | Gates et al. | 439/502 |

FOREIGN PATENT DOCUMENTS

| | | | |
|---|---|---|---|
| 3336817 | 4/1985 | Germany . | |
| 2-288176 | 11/1990 | Japan | 439/502 |

OTHER PUBLICATIONS

IBM Technical Disclosure, vol. 35, No. 3, p. 134, Aug. 1992.

*Primary Examiner*—Neil Abrams
*Attorney, Agent, or Firm*—Lawrence R. Fraley

[57] ABSTRACT

A cable assembly for coupling, e.g., electrically, a plurality of electronic components such as TV's, VCR's, AM/FM tuners, speakers, etc., to a common power source, e.g., AC, which includes a input module adapted for being directly coupled to the power source, a junction module for being coupled to the input module, at least one adapter for being directly coupled to a respective electronic component and also to the junction module, a first flexible cable member for coupling the input and junction modules, and at least one second flexible cable member for electrically coupling the junction module and various adapters. In a preferred embodiment, each module (both input and junction) includes a housing with an associated circuit board located therein and each flexible cable member includes a flexible segment with electrical couplers on the opposing ends thereof for being directly connected to the various circuit boards used within the modules. A method of coupling the various electronic components is also provided.

11 Claims, 7 Drawing Sheets

CABLE ASSEMBLY FOR MULTIPLE ELECTRONIC COMPONENTS

The application is a continuation of application Ser. No. 08/057,363, filed May 5, 1993, now abandoned.

TECHNICAL FIELD

The invention relates to cabling assemblies for electrically coupling various electronic components, e.g., televisions (TV's), video cassette recorders (VCR's), amplifiers, etc., to a suitable power source, e.g., AC. The invention is thus particularly related to the home entertainment field, but, as defined, has even broader applicability to other systems wherein various electronic components require coupling.

BACKGROUND OF THE INVENTION

In today's environment, many consumers possess and utilize a variety of home entertainment products, including, e.g., computers, televisions, VCR's, AM/FM tuners and amplifiers, phonographs, etc. Such products will be referred to herein as electronic components. Typically, these components are located in close proximity to one another, e.g., within the consumer's home, and are coupled to an associated power source, e.g., normal AC line current. Because each such component also typically requires more than one input and output means, e.g., electrical wiring, antenna leads (TV's, tuners) and cable leads (TV 's)), the positioning of several such components in close proximity can present a potential problem with respect to both appearance and safety.

In U.S. Pat. 4,337,480 (Bourassin et al), there is described an interconnection system which is designed to interconnect a TV receiver to a plurality of peripheral devices such as video games, teletext receivers, etc., the system utilizing a plurality of control stages associated with the devices, a corresponding plurality of electronic switches and a microprocessor, all working in unison with a remote control system to generate and transmit the needed commands to the system. Such as system appears relatively complex and thus costly to the average consumer. In U.S. Pat. 4,602,164 (Gore et al), there is described a system for packaging and grounding various electronic devices such as personal computers, the system primarily designed to provide EMI shielding and requiring use of an electrical interface coupled to the various devices using individual wiring or the like. This system provides such protection through use of an electrically conductive housing containing the interfacing, main processing unit (MPU), but, as indicated, appears to require separate wiring to couple the MPU to the individual external devices. In 4,974,121 (Masuko et al), there is described a "wiring module" to electrically interconnect various electrical parts all located on a common equipment frame, this "module" essentially consisting of a common, elongated circuit board with protruding edges for coupling to respective connecting structures associated with the various parts. Use of such a fixed element thus appears to mandate the described positioning of the parts on such a common frame in order to effect proper connections thereto.

As will be defined in greater detail hereinbelow, the present invention provides a new and unique means for electrically coupling a plurality of electronic components as defined above without the necessity of a multitude of electrical wires, antenna and cable leads, etc. which would otherwise present an unsightly appearance and also present a potential safety problem, e.g., from tripping, to the system's user. The invention as defined herein is relatively inexpensive, easy to operate, and, equally significant, adaptable to many existing entertainment systems including the aforementioned and similar components. The invention combines the advantageous teachings of using flexible cabling in addition to connection structures of relatively simple design for providing needed coupling. As understood from the following, the invention does not require close positioning of the various components being coupled, e.g., on a common frame or the like, does not require relatively complicated and costly interconnecting structures and functional elements, nor does the invention mandate individual connections, e.g., wiring, between a common control unit (if utilized) and each of the various peripheral components which operate in conjunction therewith.

As understood from the following, the cable assembly as defined herein is readily adaptable to other than entertainment systems and may in fact be used in more commercial settings, including a typical business office setting wherein electronic components such as computers, printers, and facsimile machines are employed.

It is believed that a cable assembly possessing the above significant advantages over known connections schemes, as well as other advantages discernible from the following description, would constitute a significant advancement in the art.

DISCLOSURE OF THE INVENTION

It is, therefore, a primary object of the present invention to enhance the art of cable assemblies and particularly those used to electrically couple a plurality of electronic components such as defined herein for use in home entertainment and other systems.

It is another object of the invention to provide a cable assembly which can couple several such components with a minimum of interconnecting means, can do so effectively and relatively inexpensively, and which can be easily utilized by the average consumer.

It is yet another object of the invention to provide such a cable assembly which is also readily capable of being utilized with many existing home entertainment and the like systems using various electronic components without extensive modification thereto.

In accordance with one aspect of the invention, there is provided a cable assembly for electrically coupling a plurality of electronic components to a common power source, e.g., AC, wherein the assembly includes an input module for being coupled to the power source, at least one junction module for being coupled to the input module, at least one adapter associated with each of the respective electronic components being coupled by the invention, a first flexible cable member for electrically coupling the input and junction modules, and at least one second flexible cable member for electrically coupling the junction module with a respective adapter. Preferably, more than one such second flexible cable members will be utilized, depending on the number of adapters (and thus electronic components) used in the overall system.

In accordance with another aspect of the invention, a method is provided for coupling electronic components to a common power source comprising the steps of directly coupling an input module to a common power source, coupling at least one junction module to the input module using a singular, first flexible cable member, directly coupling an adapter to a respective one of each of the electronic components, and coupling the junction module to each of the adapters using a singular, second flexible cable member, thereby coupling the electronic components to the common power source.

BEST MODE FOR CARRYING OUT THE INVENTION

For a better understanding of the present invention, together with other and further objects, advantages and capabilities thereof, reference is made to the following disclosure and appended claims in connection with the above-described drawings.

By the term input module as used herein will mean an electrical structure for electrically coupling, e.g., directly, to a power source such as AC to receive electrical current therefrom and also capable of receiving other input means such as TV cable connections, antenna connections, etc. in order to pass the current from such a source and the signals from such input means on to other parts of the invention. By the term junction module as used herein will mean an electrical structure for electrically coupling the input module to other parts of the invention, particularly the adapter(s) for use herein, to pass electrical current and the aforementioned signals to said other parts as needed. By the term flexible cable as used herein will mean an electrically insulative member having a plurality of conductor elements, e.g., wiring, therein to provide an appropriate passage for the various signals and current between the various module and adapter elements of the invention, as required to effectively operate the system, e.g., home entertainment, coupled by the invention. By the term circuit board as used herein will mean a dielectric substrate having a plurality of electrical conductor traces or lines therein and/or thereon. Several various circuit board structures are known in the art, as are the several different dielectric materials, e.g., fiberglass reinforced epoxy resin, Teflon (a trademark of the E. I. duPont de Nemours Company), etc. and conductor materials, e.g., copper, used for such conductor traces or lines as part thereof. Finally, by the term electronic component as used herein will mean any electrical device or unit capable of performing an electrical function, primary examples of such components being, as also stated hereinabove, TV's, VCR's, phonographs, AM/FM tuners and amplifiers, speakers, compact disk (CD) players, personal computers (PC's), video cameras, etc. Other examples, e.g., if an office setting, may include photocopiers, printers, facsimile machines, etc.

Figure 1:
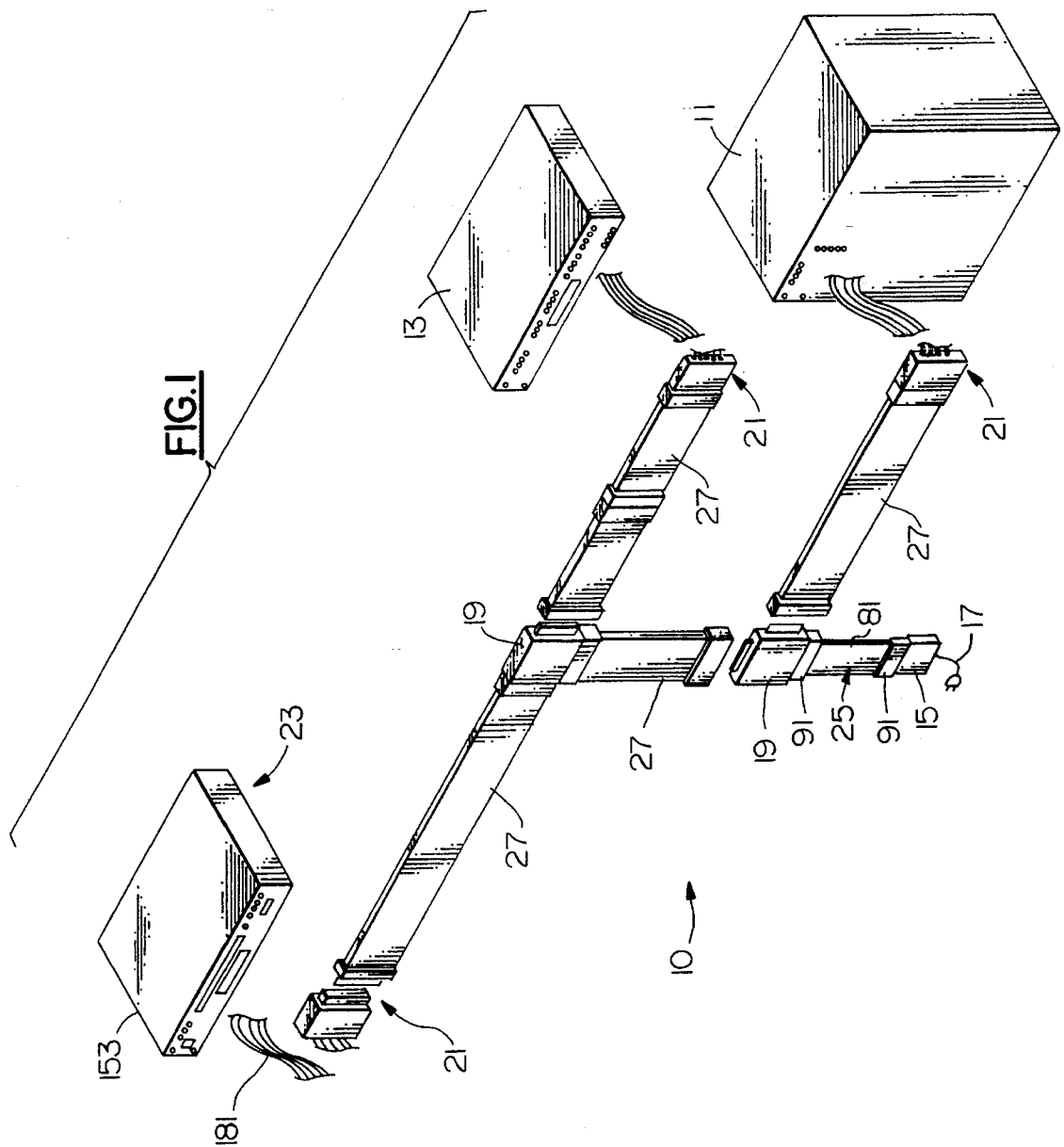
FIG. 1 is an exploded perspective view of a cable assembly and associated electronic components for being coupled to the assembly, in accordance with a preferred embodiment of the invention.

In FIG. 1, there is shown a cable assembly 10 in accordance with a preferred embodiment of the invention. Assembly 10, as mentioned, is designed for electrically coupling a plurality of electronic components, e.g., a TV 11 and a AM/FM tuner/amplifier 13, to a suitable power source, e.g., AC. Although only two such components are illustrated in FIG. 1, it is well understood that the invention is capable of coupling several more such components. The two shown are thus provided for illustration purposes only.

Cable assembly 10 is uniquely adaptable for ready utilization with many existing components currently on the market without substantial modification thereto. As will be described hereinbelow, substantially all currently known such components can be readily attached to (and thus coupled by) the present invention with minimal effort. Further, the invention is readily usable by the average consumer.

As shown in FIG. 1, cable assembly 10 includes an input module 15 which, as defined in greater detail hereinbelow, is capable of being directly coupled to the preferred, common power source. In a preferred embodiment, input module 15 includes a conductive wire 17 (see also FIG. 2) which can be directly inserted within a typical socket found in the homes of many consumers. Cable assembly 10 further includes at least one junction module 19 which, as defined, is electrically coupled to input module 15 and serves as a junction for eventual coupling to the various electronic components of the system, e.g., home entertainment, being coupled. In a preferred embodiment, junction module 19 (see also FIG. 4) includes at least four coupling locations, one designated for the respective coupling means to input module 15, with the remainder designated for coupling to other parts of the invention as desired.

Cable assembly 10, as further shown in FIG. 1, further includes at least one adapter 21 (see also FIG. 5) for being directly electrically coupled to a respective one of the system's electronic components. Accordingly, a singular adapter is used for each such component, to couple said component to cable assembly 10 and thus to the common power source. Although two junction modules 19 are illustrated in FIG. 1, it is understood that only one such module is necessary for the particular embodiment depicted in FIG. 1. This is possible because the first module (the lower) includes three designated coupling locations to thus serve the three adapters depicted in FIG. 1 (the third adapter being to the left) utilized in conjunction with an optional control unit 23, described below. The second junction module (the upper) in FIG. 1 is thus provided for illustration purposes only to further represent the additional capabilities of the present invention.

Cable assembly 10 further includes a first flexible cable member 25 for electrically coupling the input module 15 and first junction module 19. The particular details of this flexible cable member, as well as the invention's input and junction modules, will be provided in greater detail below.

Finally, cable assembly 10 in FIG. 1 further includes a second flexible cable member 27 for electrically coupling the invention's junction modules 19 to the described adapters 21. Such a second flexible cable member will also be described in greater detail hereinbelow.

In summary, it can be seen in FIG. 1 that the invention provides a new and unique cable assembly for electrically coupling a plurality of various electronic components to a singular power source using a minimum of flexible electrical cabling. As will be defined, the invention provides means for transmitting both electrical current and various electronic signals through this common cabling system using the minimum elements described above and hereinbelow. The invention thus overcomes the need for massive electrical wiring between each of several such electronic components and the designated power source. As will also be described, the invention, in addition to being of relatively uncomplex structure, is capable of being operated (e.g., segmented as needed) in a facile manner by the average consumer.

Figure 2:
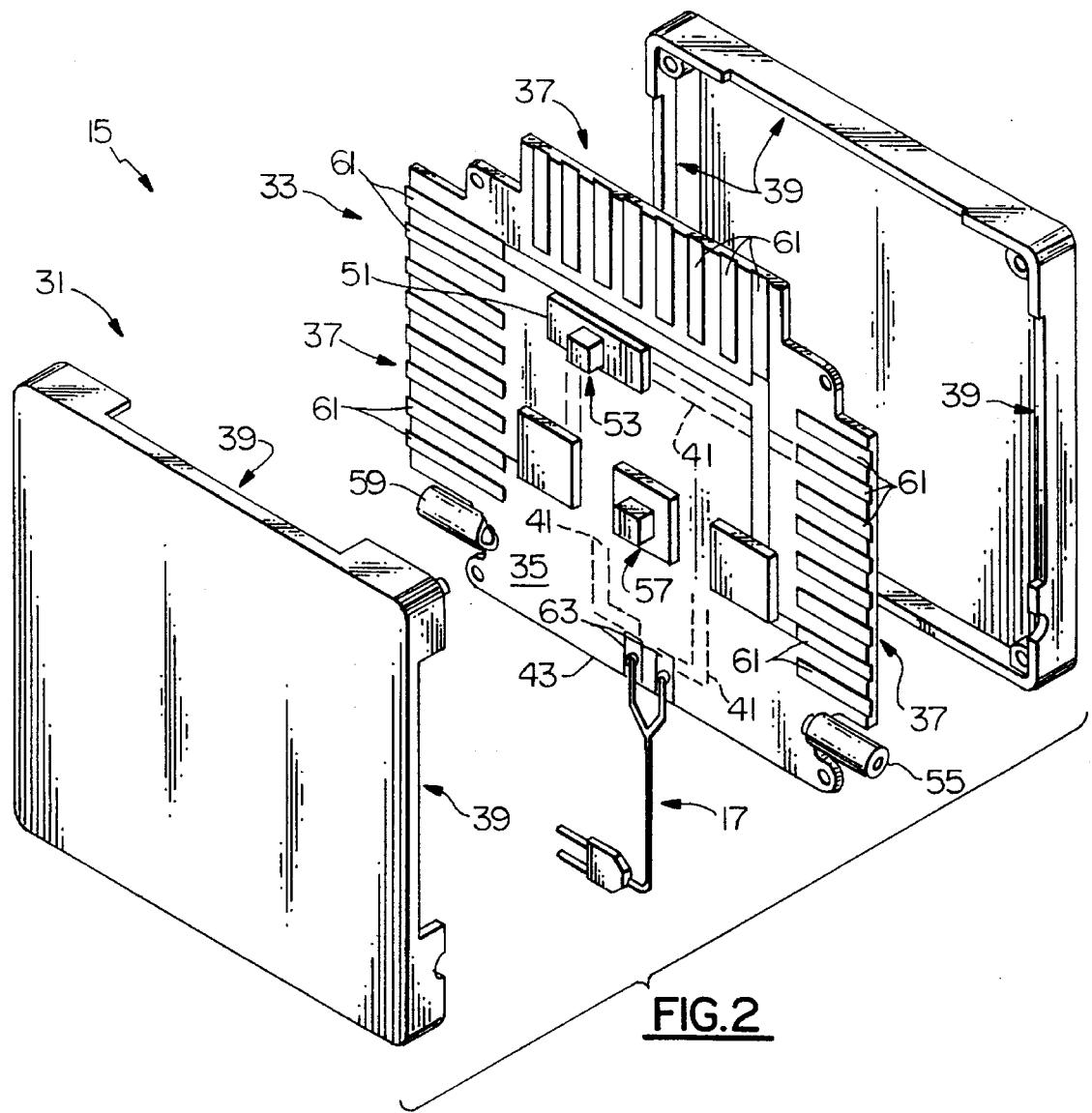
FIG. 2 is an exploded perspective view, on a much enlarged scale over the view of FIG. 1, illustrating a preferred embodiment of an input module for use in the cable assembly of FIG. 1.

In FIG. 2, there is shown input module 15 in greater detail. Input module 15 preferably includes a two-part housing 31 having therein at least one circuit board 33. Housing 31 is preferably a molded polymer (plastic) material which, when fastened, substantially covers the central body portion 35 of board 33 to enable projecting edge portions 37 thereof to project externally through associated slots 39 formed in the housing. In one embodiment the projecting edge portions 37 may project a total distance of about 0.500 inch from the respective outer surfaces of the rectangular-shaped housing.

To accommodate the various electronic components as described above, input module 15 includes additional electrical elements which are electrically coupled to associated circuitry, e.g., 41, located on the dielectric (fiberglass-reinforced epoxy resin) substrate 43 of board 33. The circuitry 41, only portions of which are shown in FIG. 2 for illustration purposes, is preferably plated copper or the like provided on and/or within the dielectric substrate in accordance with known technology. By way of example of such elements, the board 33 shown in FIG. 2 may include a circuit breaker reset device 51, an associated on/off indicator 53, a computer input (phone jack) 55, various AC regulators 57, e.g., a line filter and surge suppressor, a cable (TV) input 59, etc. Understandably the above described electrical devices are coupled as needed using the circuitry, e.g., 41, of board 33 and further description is thus not believed necessary. Significantly, board 33 includes a plurality of input/output conductors 61 located along each of the three illustrated projecting edges 37. Eight such conductors are illustrated for each projecting edge, but it is understood that the invention is not limited to this number as the appropriate number to be utilized depends on the particular system requirements. Each such conductor for each respective edge includes a corresponding, similar conductor at a similar location along each of the respective, other conductor edges on board 33, excluding the lower edge.

As described above, board 33 also includes input/output conductors (63) for being electrically coupled, e.g., soldered, to the conductive leads of connecting wire 17, which wire, as mentioned, is capable of being directly plugged into a home socket or other electrical structure associated with typical line current (AC).

In a preferred embodiment of the invention, input module 15 is of the rectangular shape configuration as shown with side dimensions each of a total length of about three inches. The overall thickness for such a structure is preferably only about one inch. This part of the invention thus presents a compact design of relatively small overall size.

The illustrated pattern of conductors 61 for each of the three edge patterns are preferably identical and include similar functions, e.g., AC power (common), audio signal, video signal, antenna (common), etc., in a similar predefined order for each edge portion. Such duplication reduces the complexity of the design and facilitates coupling to similar structures, e.g., cable member 25. Additionally, each of the respective conductors are of a predetermined width and thickness depending on the desired function for these. These conductors may include similar dimensions to those identified below for conductors (89, FIG. 3) in the invention's flexible cable members. Conductors 61 on each edge 37 are shown as being arranged in a planar, substantially linear pattern along the edge.

Figure 3:
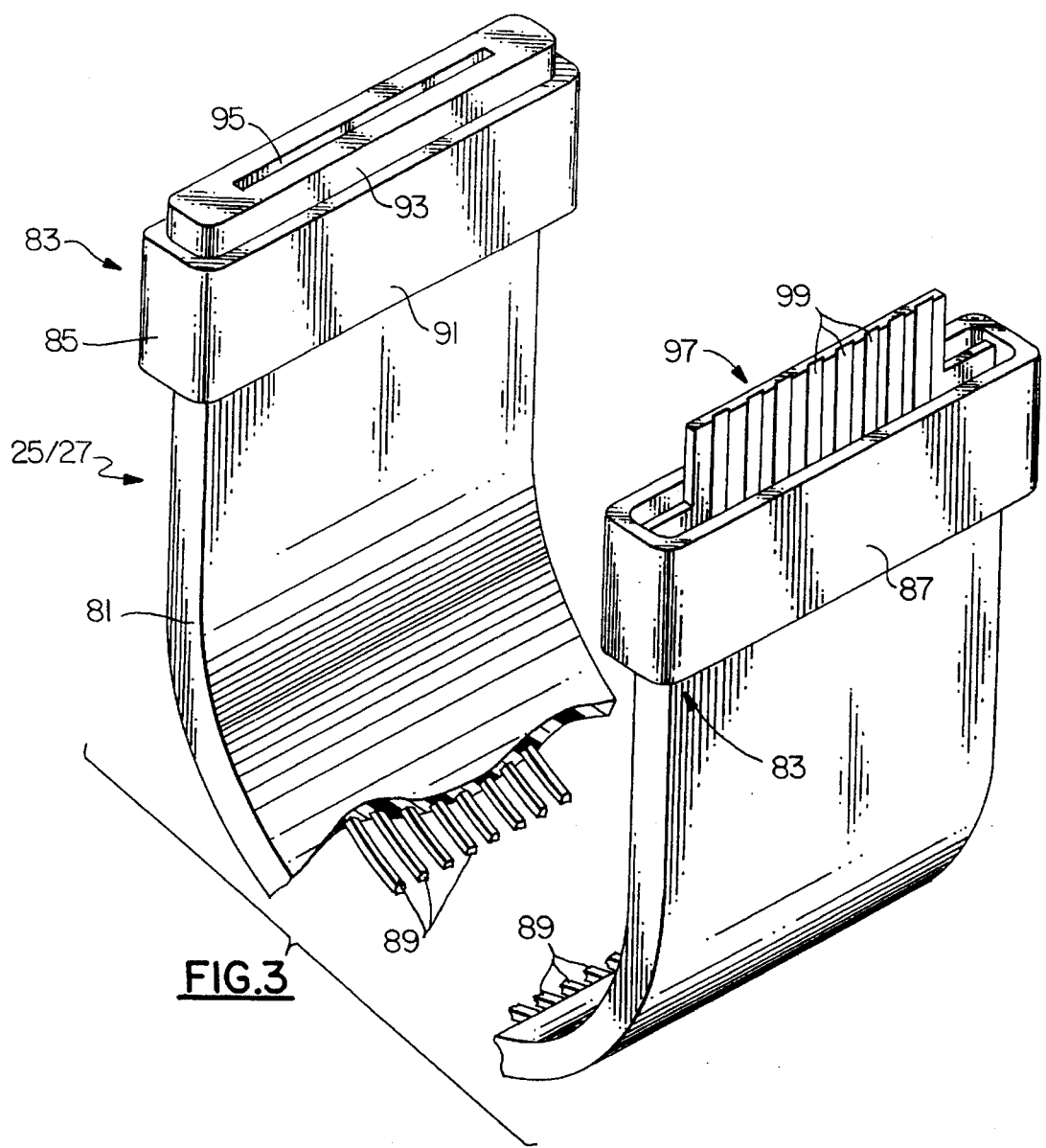
FIG. 3 is a much enlarged view over the view in FIG. 1, illustrating a flexible cable member having two different versions of couplers which may be utilized in conjunction with the cable system of FIG. 1, to electrically couple the input and junction modules, as well as the adapter(s) for use therewith.

In FIG. 3, there is shown one embodiment of a first flexible cable member 25 for use with the invention. As shown, flexible cable member 25 includes a flexible segment 81 having opposed ends 83 with couplers 85 and 87 thereon. In a preferred embodiment, each flexible cable segment 81 is comprised of a substantially flat dielectric material (e.g., polyamide) having therein the desired number of conductors 89 for transmitting electrical current and designated signals through the flexible cable between the respective locations being coupled. Preferably, copper wiring is used for each conductor path 89, this wiring differing in thickness depending on the operational requirement therefor. For example, the thickness of the wiring used to conduct electrical current may be thicker than that required to transmit audio and/or video signals. In one example of the invention, the designated conductor wire for carrying electrical current may possess a thickness similar to that of 14 or 16 gauge wiring, while the designated wiring for audio and/or video signals may possess a thickness similar to that of 20 or 22 gauge wiring. Although eight such conductors are illustrated in FIG. 3, the invention is obviously not limited thereto as this number may increase or decrease depending on the desired operational capabilities for the invention.

In FIG. 3, couplers 85 and 87 are represented in both the female and male versions thereof. Coupler 85 is, as shown, of the female type and includes a molded, conductive polymer (plastic) member 91 sealed onto the end of the flexible cable segment and further including a female portion 93 as part thereof. Member 91 is electrically conductive to assure electromagnetic compatibility with internal elements (e.g., conductors 89). Portion 93 includes a slot 95 therein for receiving a respective projecting edge portion of circuit board 33 of input module 15. (This coupler 85, as defined, may also be connected to other parts, including adapters 21 and junction module 19, if desired.) Each of the illustrated conductor wiring 89 includes a terminal end (not shown) which extends within slot 93, e.g., as a conductor trace or the like, such that when the respective conductors 61 on edge portions 37 are inserted within slot 95, said conductors will engage these terminating end portions, preferably in a frictional manner, to thus provide effective contact therewith. Accordingly, the respective widths of the terminal ends of conductor wiring 89 and the associated conductors 61 on each respective projecting edge portion 37 are substantially the same.

Coupler 87, of the male variety, includes a projecting edge segment 97 having a plurality of conductor traces 99 thereon, each of which is electrically connected to or forms an extension of a respective conductor wire 89. Conductor traces 99 are shown in FIG. 3 as being arranged in a planar, substantially linear pattern along the forward protruding edge segment 97. This male coupler 87 is thus ideally suited for being connected to an associated module, either input or junction, should such module be of a female configuration. Such a configuration is readily possible, e.g., for the input module in FIG. 2, by providing a circuit board with internally located edge portions (and thus not projecting as shown) such that the extending edge 97 may be inserted within the respective, provided opening or slot 39 to frictionally engage the edge portion and effect connection between the spaced conductors 61 and 99. Such spacings are thus substantially similar for this purpose. The adapters 21 defined hereinbelow are ideally suited for coupling to a respective male coupler 87. The particular flexible cable member 25 illustrated in FIG. 3 is thus capable of being used for both the first and second flexible cable members of assembly 10. It is also possible, as understood, to utilize such a member with both female couplers or male couplers thereon, rather than the alternative versions illustrated. In a preferred embodiment of the invention, the desired flexible cable member to be used for first cable 25 includes both female couplers 83 as part thereof. The particular embodiment depicted in FIG. 3 is utilized for the second flexible cable member 27. Again, however, this particular embodiment can be used for both cable members of the invention depending on the corresponding designs for the respective adapters and modules being coupled.

Figure 4:
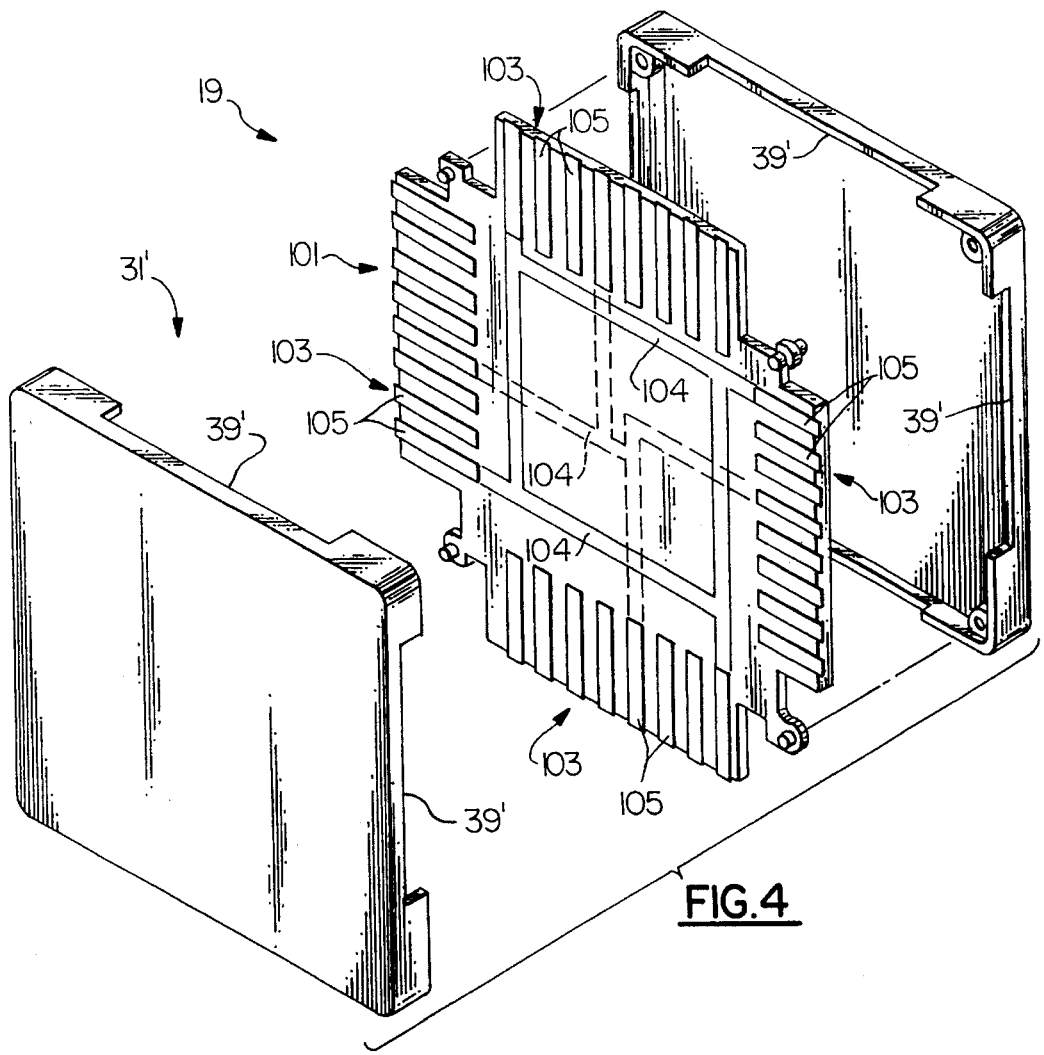
FIG. 4 is an exploded perspective view, on a much enlarged scale over the view of FIG. 1, illustrating a junction module in accordance with a preferred embodiment of the invention.

In FIG. 4 there is shown a junction module 19 in accordance with a preferred embodiment of the invention. Module 19, like input module 15, includes a two-part housing 31' having channels for openings 39' therein similar to those in FIG. 2. Such a housing is preferably of the same material as housing 31. Module 19 further includes a common circuit board 101 with, preferably, four similar projecting edge portions 103. Each edge portion 103 includes a plurality of conductors 105 which, like those (61) in FIG. 2, run to the edge and are electrically interconnected through appropriate circuit traces, e.g., 104. These traces, similar to those conductor lines 41, are located upon and/or within the dielectric, e.g., fiberglass reinforced epoxy resin, of circuit board 101. As shown in FIG. 4, each pattern of conductors (105) is similar to the other patterns for the advantages cited above. Conductors 105 are shown as occupying a substantially linear pattern and lie in a plane on each of the respective, planar projecting edge portions 103 of board 101. Additionally, each respective conductor is electrically coupled to the corresponding, similar conductor in the remaining patterns. In one example of the invention, a housing having side dimensions of about three inches and an overall thickness of about one inch is preferred, with the projecting edge portions 103 extending a distance of about 0.500 inch from the peripheral outer surfaces of the closed housing. It is further understood that modifications may be made to the module in FIG. 4 to accommodate the male coupler 87, should it be desired to use such a coupler to electrically couple module 19 to other parts of the invention. Such modification, as mentioned with respect to module 15 in FIG. 2, may involve shortening of each edge portion such that these will be recessed within housing 31' to accommodate receipt of a respective projecting edge 97 of such a coupler. Finally, although eight circuit conductors 105 are shown in FIG. 4, the invention is, of course, not limited thereto in that any number of such conductors may be provided, depending on the operational requirements for the invention. Such conductors may also possess different widths and thicknesses depending on the required function for each.

Figure 5:
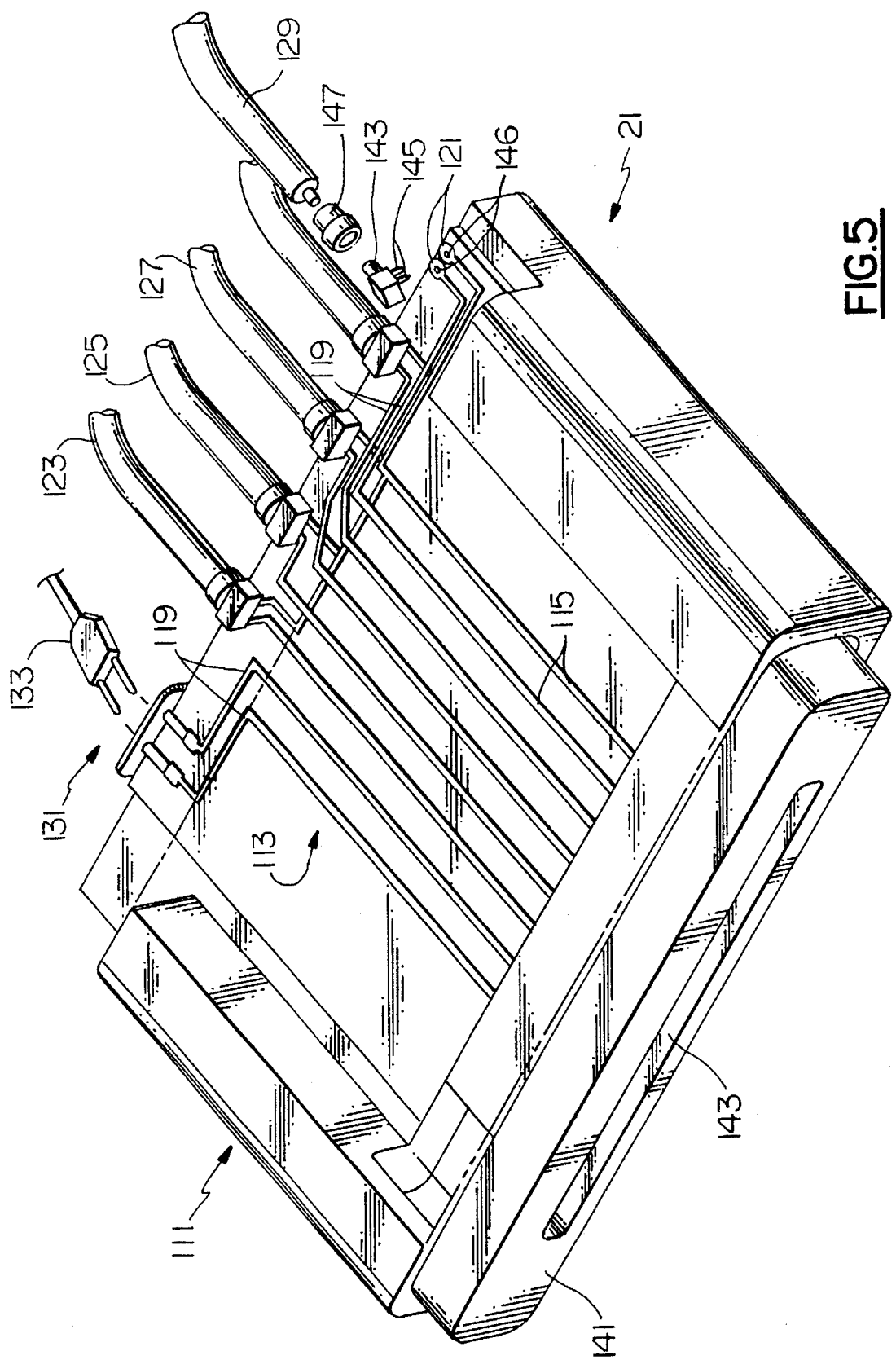
FIG. 5 is a much enlarged view over the view in FIG. 1, illustrating a preferred embodiment of an adapter for use in the cable assembly of FIG. 1.
Figure 6:
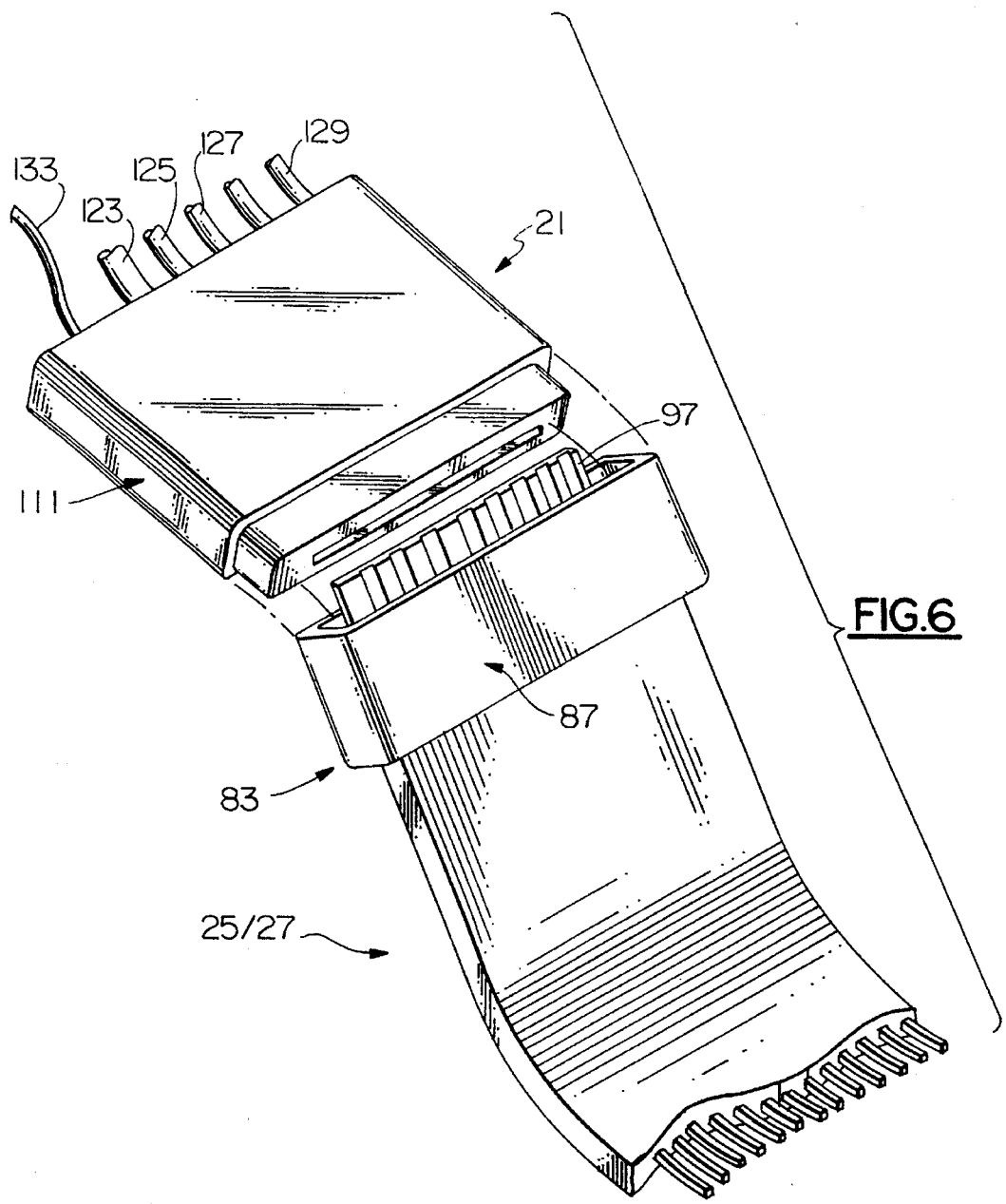
FIG. 6 is an exploded perspective view, on an enlarged scale over the view in FIG. 1, illustrating one example of an acceptable electrical coupling between one version of a flexible cable of the invention and the adapter such as depicted in FIG. 5.

In FIG. 5, there is shown one embodiment of an adaptor 21 for use in the present invention. As defined, such an adaptor is utilized for being electrically coupled to a respective electronic component. Thus, one adaptor is utilized per such component. Adaptor 21 preferably includes an enclosing housing 111 (only partially shown in FIG. 5, the cover shown in phantom) of electrically conductive (e.g., conductive polymer) material, having therein a printed circuit board 113 which, as illustrated, includes a plurality of conductive traces 115 thereon. Traces 115, being mounted on an insulative board, are of course electrically isolated from the conductive housing. Board 113 is of a known dielectric as cited above and traces 115 are also of known material, e.g., copper. Conductive traces 115 terminate at the edge of board 113, e.g., at female (apertured) pads 121. To these termination pads 121 may be electrically coupled the various conductive means which are necessary for use with the respective electronic component. In the embodiment depicted in FIG. 5, for example, the various coupling means from adaptor 21 may include an audio input lead 123, a video input lead 125, a video output lead 127 and an electrical ground 129. Further, adaptor 21 may include an input section 131 for coupling the electrical wire 133 from such a component thereto, to thus couple the component to an associated power source, e.g., AC. Other leads or the like may also be provided and coupled, preferably in a separable fashion as shown in FIG. 5 for conductor 129, with respect to adaptor 21. Conductive traces 115 terminate at the opposite end (from pads 121) in a protruding female section 141 which is substantially similar to section 93 for coupler 85 in FIG. 3. Accordingly, section 141 includes a slot 143 therein for receiving a respective projecting male portion 97 (FIG. 6) of an end portion of the desired flexible cable member (25 or 27) for coupling thereto. Housing 111 is electrically conductive for the same reasons stated above with respect to member 91. Traces 115, located on a dielectric board, are of course isolated from housing 111.

FIG. 5 also illustrates one example of a separable connection device for connecting the respective ends of such leads 123, 125,127 and 129 to the corresponding edge of adapter 21. The termination of each lead may include a ground lead and a "hot" lead, both housed in a crimp-type connector 147 and an associated receptacle 143, secured to connector 147, e.g., with screw threads. Receptacle 143 includes projecting pins 145 which in turn may be soldered within respective openings 146 in the terminating pads 121.

It is understood that the respective leads and number of conductive traces as shown in FIG. 5 may, of course, be different, depending on the operational requirements for this part of the invention. Understandably, other such lead and the like elements may be readily utilized and further description is not believed necessary.

Figure 7:
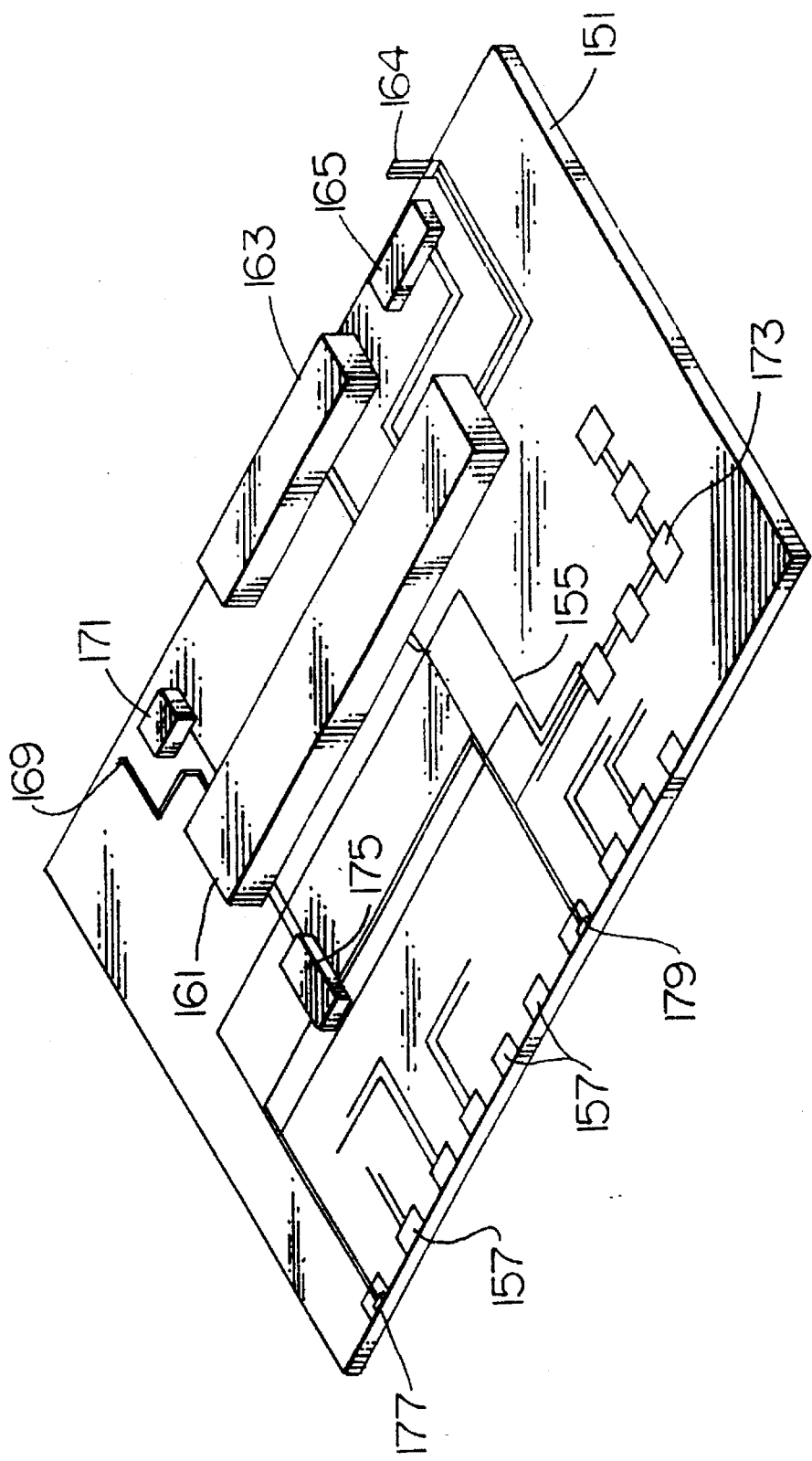
FIG. 7 is a much enlarged view over the view in FIG. 1, illustrating a preferred embodiment of a circuit board structure and associated electrical elements for use therewith which may form part of the preferred control means of the invention, if used.

As mentioned above, it is also possible in the present invention to utilize a control unit 23 (FIG. 1) which in turn may provide the function of controlling the mode of operation of various ones of the electronic components being coupled by assembly 10. Such a control unit may be remotely operated by a suitable remote control (not shown), voice activation or the like. In FIG. 7, there is shown one example of a circuit board structure 151 which may form part of unit 23. Such a structure, in comparing with FIG. 1, would be included within a protective housing 153 having a plurality of sides and respective bottom and top covers. Such a housing would preferably be of electrically conductive material, e.g., conductive polymer (to provide electromagnetic compatibility). Effective connections thereto would be provided by associated leads, wiring or the like such as illustrated in FIG. 5.

Board structure 151, depending on the electronic components being coupled by assembly 10, may include a plurality of electrical components as shown. Each of these components is preferably coupled using conductive traces 155 located on and/or within the boards' dielectric. Known dielectrics and trace materials, such as cited above, may be used. Preferably, each trace terminates with an edge pad 157 similarly to the boards in FIG. 2, 4 and 5. In one example, board 151 may include the following electrical components: (1) a central processing unit (CPU) 161, including a memory semiconductor device (chip); (2) an LED display 163 (preferably aligned with a respective opening (not shown) in one of the sides of housing 153); (3) a selector bar 165; (4) a programmable sensor pad 164 for remote control and/or voice activation reception; (5) a power-on indicator 169; (6) an enabling switch 171 that activates the function chosen, by the selector bar, via coupling the corresponding circuits and transmitting the signals to the selected electronic components; and (7) a plurality of discreet components 173, such as capacitors, resistors, inductors, etc., as needed. Additionally, board 151 may also include micro-switching elements 175 for linking circuits via the selector bar. The number 177 in FIG. 7 represents a preferred location for an audio output, if desired, while numeral 179 represents a preferred location for an audio input to board 151. In the above design, CPU 161 will function to process all indicator, selector, voice activation, etc., signals and to disseminate these to the respective junctions. Appropriate connections to the respective terminal edge conductors 157 with the respective wiring, which is represented by number 181 in FIG. 1, may be accomplished by known techniques, e.g., soldering, or the like or, as identified in FIG. 5, be of the separable type to enable ready separation thereof, if desired. It is possible to utilize separable leads and/or conductive wiring to couple to the adaptor 21 as shown in FIG. 5, with fixed attachments between the respective opposing ends of these elements and the associated conductors on the circuit board 151 used in control unit 23.

The invention thus defines a means whereby a plurality of electronic components may be effectively coupled to a common power source or the like using a minimum number of elements. Additionally, the invention as defined is of relatively simple construction and thus relatively easy to operate for the average consumer. Further, the invention presents an affordable alternative to the existing practice of requiring several wires and/or leads to individually couple each such component. Although the invention as defined herein has identified such coupling to be of electrical nature, it is also within the scope of the invention to provide suitable fiber optic coupling at designated portions thereof (e.g., to replace selected ones of the aforementioned copper wires 89 (FIG. 3) with optical fibers having appropriate terminal ends (e.g., retaining ferrules) as are known in the art). Similar modifications to accommodate such optical fiber utilization could be readily made to the respective modules and adapter elements of the invention by one of ordinary skill in the art. Further description is thus not believed necessary. The following chart represents an example of a number of input and output connections desired for each of the identified electronic components.

| COMPONENT | INPUT CONNECTIONS TO COMPONENTS (See Log) | OUTPUT CONNECTIONS FROM COMPONENTS (See Log) |
|---|---|---|
| VCR | 1, 2, 3, 4, 5, 6, 8 | 1, 2, 8 |
| CAMERA | 1, 2, 3, 4, 5, 6, 8 | 1, 2, 7 |
| PHONO | 6 | 1, 3 |
| TUNER/AMP | 1, 3, 4, 6, 8 | 1 |
| CD | 6 | 1 |
| TV | 1, 2, 3, 4, 5, 6, 8 | 8 |
| COMPUTER | 6 | 2, 8 |

LOG:
1 = Audio (mono-2 wires; stereo-3 wires; quad-4 wires) common ground
2 = Video (3 wires) common ground
3 = Ground (1 wire)
4 = Cable TV (2 wires)
5 = TV Antenna (2 wires)
6 = AC (2 wires)
7 = DC (2 wires)
8 = Speakers (same as item #1)

While it has been shown and described what are at present considered the preferred embodiments of the invention, it will be obvious to those skilled in the art that various changes and modifications can be made therein without departing from the scope of the invention as defined by the appended claims.

What is claimed is:

1. A cable assembly for coupling a plurality of different electronic components to a suitable power source, said cable assembly comprising:

an input module adapted for being directly coupled to a power source, said input module including a housing having a circuit board therein, said board including at least one edge portion having a plurality of conductors thereon, said conductors being arranged in a substantially planar and linear pattern;

at least one junction module for being coupled to said input module, said junction module including a housing having a circuit board therein, said circuit board in said housing of said junction module including at least two edge portions each having a plurality of conductors thereon, said conductors on each of said edge portions being arranged in a substantially planar and linear pattern;

at least two adapters each for being coupled to said junction module and for being directly coupled to a respective one of said electronic components, each of said adapters including a housing having a circuit board therein, said circuit boards within said housings of said adapters each including at least one edge portion having conductors thereon;

a first flexible cable member of substantially flat construction for coupling said input module to said junction module, said first flexible cable member being electrically coupled to said conductors on said edge portion of said circuit board of said input module and to a first of said edge portions of said circuit board of said junction module in a frictional manner; and a pair of second flexible cable members each of substantially flat construction for coupling said junction module to a respective one of said adapters, each of said second flexible cable members being electrically coupled to said conductors on said edge portion of said circuit board of a respective one of said adapters and to a second edge portion of said circuit board of said junction module in a frictional manner, said first and second flexible cable members, input and junction modules adapted for receiving and transmitting both electrical current and electronic signals, including both audio and video signals both said first and second flexible cable members including a coupler on opposing ends thereof, said couplers including a plurality of conductors arranged in a substantially planar and linear pattern for engaging respective ones of said conductors on said input and junction modules.

2. The cable assembly of claim 1 wherein the number of said edge portions of said circuit board within said housing of said junction module is four.

3. The cable assembly of claim 2 wherein said first flexible cable member is electrically coupled to but one of said edge portions of said circuit board within said housing of said junction module and the remaining three edge portions are electrically coupled to respective ones of said second flexible cable members.

4. The cable assembly of claim 1 further including a control unit for controlling the mode of operation of various ones of said electronic components coupled by said cable assembly.

5. The cable assembly of claim 4 wherein said control unit is electrically coupled to one of said adapters.

6. The cable assembly of claim 5 wherein said control unit includes a housing having at least one circuit board therein, said circuit board including an edge portion with a plurality of input/output conductors located therealong, said adapter being electrically coupled to selected ones of said conductors.

7. The cable assembly of claim 1 wherein said first cable member includes a flexible cable segment having at each of the opposing ends thereof one of said couplers.

8. The cable assembly of claim 1 wherein said second flexible cable member includes a flexible cable segment having at each of the opposing ends thereof one of said couplers.

9. A home entertainment system comprising a plurality of different electronic components and a cable assembly for coupling said plurality of different electronic components to a suitable power source, said cable assembly including an input module adapted for being directly coupled to a power source, said input module including a housing having a circuit board therein, said board including at least one edge portion having a plurality of conductors thereon, said conductors being arranged in a substantially planar and linear pattern;

at least one junction module for being coupled to said input module, said junction module including a housing having a circuit board therein, said circuit board in said housing of said junction module including at least two edge portions each having a plurality of conductors thereon, said conductors being arranged in a substantially planar and linear pattern;

at least two adapters each for being coupled to said junction module and for being directly coupled to a respective one of said electronic components, each of said adapters including a housing having a circuit board therein, said circuit boards within said housings of said adapters each including at least one edge portion having conductors thereon;

a first flexible cable member of substantially flat construction for coupling said input module to said junction module, said first flexible cable member being electrically coupled to said conductors on said edge portion of said circuit board of said input module and to a first of said edge portions of said circuit board of said junction module in a frictional manner; and a pair of second flexible cable members each of substantially flat construction for coupling said junction module to a respective one of said adapters, each of said second flexible cable members being electrically coupled to said conductors on said edge portion of said circuit board of a respective one of said adapters and to a second edge portion of said circuit board of said junction module in a frictional manner, said first and second flexible cable members, input and junction modules adapted for receiving and transmitting both electrical current and electronic signals, including both audio and video signals, both said first and second flexible cable members including a coupler on opposing ends thereof, said couplers including a plurality of conductors arranged in a substantially planar and linear pattern for engaging respective ones of said conductors on said input and junction modules.

10. A method of coupling a plurality of different electronic components to a power source, said method comprising:

directly coupling an input module to a common power source wherein said input module includes a housing having a circuit board including at least one edge portion having a plurality of conductors thereon, said conductors being arranged in a substantially planar and linear pattern;

coupling at least one junction module to said input module using a singular, first flexible cable member of substantially flat configuration wherein said junction module includes a housing having a circuit board therein including at least two edge portions each having a plurality of conductors thereon, said conductors being arranged in a substantially planar and linear pattern, said first flexible cable member being coupled to said edge portion of said circuit board of said input module and a first of said edge portions of said circuit board of said junction module in a frictional manner;

directly coupling at least two adapters each to a respective one of said electronic components wherein each adapter includes a housing having a circuit board therein including at least one edge portion having conductors thereon; and coupling said junction module to each of said adapters using a singular, second flexible cable member of substantially flat construction, thereby coupling said different electronic components to said common power source, wherein said second flexible cable member is coupled to said conductors of said edge portion of said circuit boards of said adapters and to a second edge portion of said circuit board of said junction module in a frictional manner, said first and second flexible cable members, input and junction modules adapted for receiving and transmitting both electrical current and electronic signals, including both audio and video signals, both said first and second flexible cable members including a coupler on opposing ends thereof, said couplers including a plurality of conductors arranged in a substantially planar and linear pattern for engaging respective ones of said conductors on said input and junction modules.

11. The method of claim 10 further including the step of controlling the mode of operation of various ones of said electronic components coupled to said common power source.

\* \* \* \* \*